W. H. RICHARDS.
PNEUMATIC TIRE.
APPLICATION FILED MAY 17, 1919.
1,332,953. Patented Mar. 9, 1920.
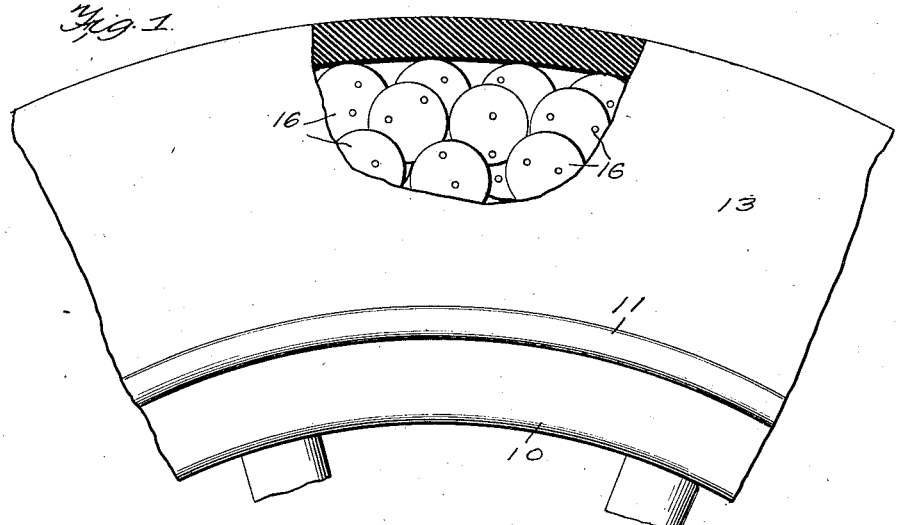
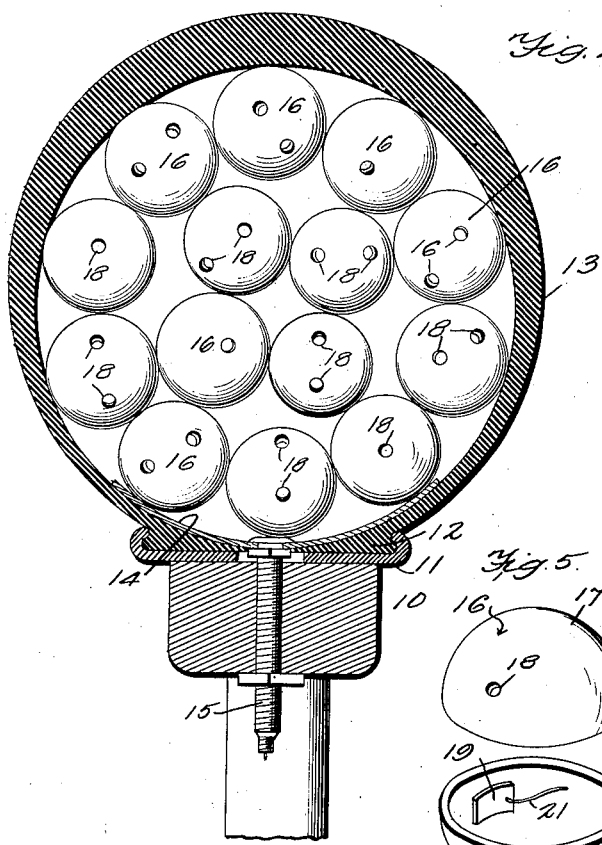
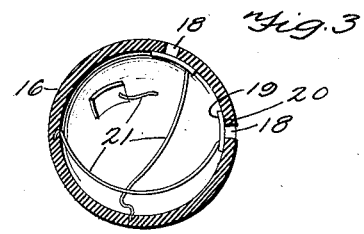
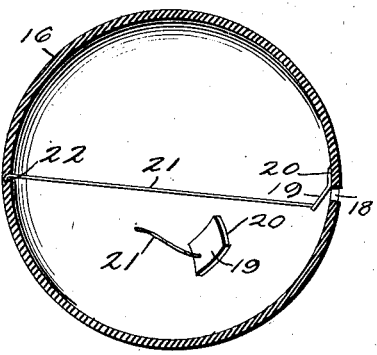
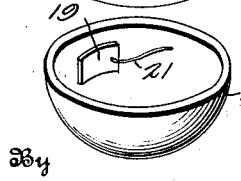
Inventor
William H. Richards,

UNITED STATES PATENT OFFICE.

WILLIAM H. RICHARDS, OF KNOXVILLE, TENNESSEE.

PNEUMATIC TIRE.

1,332,953.  Specification of Letters Patent.  Patented Mar. 9, 1920.

Application filed May 17, 1919. Serial No. 297,796.

*To all whom it may concern:*

Be it known that I, WILLIAM H. RICHARDS, a citizen of the United States, residing at Knoxville, in the county of Knox and State of Tennessee, have invented certain new and useful Improvements in Pneumatic Tires, of which the following is a specification.

My invention relates to improvements in pneumatic tires.

I am aware of the fact that it has heretofore been proposed to provide a pneumatic tire with a plurality of cells or sections, to inflate the same. In the use of such devices the cells are either inflated before being introduced into the tire casing or separate means provided for inflating the individual cells. If the separate inflating means is not employed, the tire is complicated by the provision of complicated means for inflating the several cells. As far as I am aware, no one has heretofore provided means whereby a plurality of cells placed within the tire casing may be inflated by the usual means employed in inflating the ordinary pneumatic tire, such as a single valve connected to the tire to supply air to the interior thereof.

In accordance with my invention, a tire casing of any well known or preferred type, is suitably filled with cells. The tire casing may be rendered air tight by the placing of a strip in contact with the beads thereof, if necessary, or the usual inner tube may be arranged therein, and the cells held within this inner tube. The cells are provided with inwardly opening check valves, whereby when the air under suitable pressure is pumped into the tire casing through the usual valve, such air opens the check valves and passes to the interior of the cells. When the pressure within the tire casing, exteriorly of the cells, drops below that within the cells, the valves automatically close, thereby preventing the escape of pressure from the cells. It is thus seen that should the tire casing or one or more of the cells be punctured, the pressure within the remaining cells will maintain the tire casing inflated.

An important object of the invention is to provide cells of the above mentioned character, which are simple in construction, inexpensive to manufacture, strong and durable.

A further object of the invention is to provide automatic means to release the air pressure from the cells upon the expansion of the same beyond a certain limit.

Other objects and advantages of the invention will be apparent during the course of the following description.

In the accompanying drawings forming a part of this specification and in which like numerals are employed to designate like parts throughout the same, Figure 1 is a fragmentary side elevation of a pneumatic tire embodying my invention, parts being shown in section, Fig. 2 is a transverse sectional view through the tire, Fig. 3 is a transverse sectional view through one of the cells before the same is inflated, Fig. 4 is a similar view with the cell inflated and expanded with its valve opened, and, Fig. 5 is a perspective view of the sections from which the cell is formed.

In the drawings, wherein for the purpose of illustration is shown a preferred embodiment of my invention, the numeral 10 designates the felly of a wheel, such as an automobile wheel or the like. This felly is shown equipped with a clencher rim 11, for engagement with the beads 12, of a pneumatic tire casing 13, of any well known or preferred type. It is to be distinctly understood that the invention is in no sense restricted to the type of rim or tire casing shown and described, as these may be varied, if desired.

Means are provided to render the tire casing 13 air tight, if necessary, including a flexible strip or band 14, preferably formed of rubber, and engaging the inner sides of the beads 12, the ends of this strip overlapping, as is obvious. This strip 14 serves the purpose of the ordinary inner tube, and is equipped with the usual inflating valve 15, as shown.

The numeral 16 designates the cells which are suitably packed or placed within the tire casing 13. These cells may be formed of rubber or the like, and are resilient and expansible. The wall of the cell is preferably sufficiently thick so that the cell will not collapse when being handled or when placed within the tire casing, prior to being inflated. Each cell is preferably formed in semispherical sections 17, which may be vulcanized together or otherwise suitably united to form a spherical member, while the invention is in no sense restricted to this particular shape of cell. Each cell is provided with a suitable number of openings 18, a plurality of these openings being preferably employed, so that it would not be probable that all of the openings would be closed by contact of one cell with the other cell or cells. The openings 18 are adapted to be covered by check valves 19, here shown as formed of flexible leaves or sheets, arranged upon the inner side of the cell and having one end thereof attached to the same, as shown at 20, while its opposite end is free to move inwardly, to uncover the opening 18. The valve 19 however, is preferably tensioned so that it will normally remain adjacent its opening 18, so that it is adapted to quickly close the opening, to prevent pressure passing from the cell.

Means are provided to automatically open the check valves 19, when the cell expands beyond a predetermined limit, including a flexible element or cord 21 attached to the free end of the valve and to the cell at a point diametrically opposite the valve.

The invention is in no sense restricted to the particular type of check valve herewith shown and described, as any other suitable form of check valve may be employed. I have found, however, that the present check valve is extremely simple in construction and inexpensive.

In use, the tire casing 13 is suitably filled with the cells 16, and a suitable number of these cells may be crowded into the tire casing, as the cells are readily slightly compressible and are not inflated. After the tire casing is thus suitably filled with the cells 16, the strip 14 is placed in position in contact with the beads 12. The tire casing is next placed upon the rim 11, in accordance with the usual practice. The inflating valve 15 is now connected with a pump or other suitable source of compressed air, which is thereby introduced into the tire casing 13, exteriorly of the cells. Upon the introduction of this air pressure within the tire casing 13, the valves of the cells 16 open, and remain open until the pressure within the several cells equalizes with the pressure within the tire casing exteriorly of the cells, the valves perhaps remaining slightly open during the inflating process. It is thus seen that the cells will not be crushed or collapsed during the inflating process, as the pressure interiorly and exteriorly thereof is the same.

Assuming that the tire is inflated to a pressure of seventy pounds to the square inch, then the pressure within the cells will be seventy pounds and there will be a seventy pound pressure within the tire casing exteriorly of the cells. If the pressure within the tire casing exteriorly of the cells, is now suddenly reduced to sixty-five pounds, by opening the valve 15, it will be seen that the valves 19 will be instantaneously seated by the excess pressure within the cells, and held locked in the closed position, by this excess pressure.

With the cells inflated, as above indicated, it is obvious that should the tire casing 13 be punctured or a number of the cells 16 punctured, such tire casing will be maintained distended by the remaining inflated cells. The cells are free from connection with the tire casing and with each other, and due to their shape, are adapted to automatically move or readjust themselves within the tire casing to fill up the space formed by the collapsing of one or more of the cells. This is an important feature of the invention.

As there are a large number of the cells within the tire casing, it is not probable that such cells would have to be replenished, during the life of the tire casing, such cells being inflated at any time, if necessary. If it should be desired to remove the cells from the casing, one side of the casing or a portion thereof, may be removed from the rim 11, by the usual tire tool, and the cells will at once expand, due to the low pressure exteriorly thereof. When each cell expands to a certain point, such for instance to a size of twice its normal diameter, its check valve or valves are automatically opened and the air pressure exhausted therefrom. This means prevents the destruction of the cells.

It is to be understood that the form of my invention herewith shown and described, is to be taken as the preferred example of the same, and the various changes in the shape, size, and arrangement of parts, may be resorted to, without departing from the spirit of the invention or the scope of the subjoined claims.

Having thus described my invention, I claim:

1. In a tire of the character described, a tire casing, a plurality of cells arranged therein to properly fill the tire casing, said cells being arranged exteriorly of each other and free from connection with the tire casing and from connection with each other so that they are adapted to automatically readjust themselves within the tire casing, and means whereby said cells may be inflated after being placed within the tire casing.

2. In a tire of the character described, a tire casing, a plurality of relatively small cells arranged therein to fill the casing, a plurality of the cells being held within the cross sectional area of the casing, said cells being arranged wholly exteriorly of each other and being free from connection with each other and from the casing, each cell being provided with a plurality of inwardly opening check valves.

3. In a tire of the character described, a tire casing, means to render the tire casing air tight, a plurality of separate cells arranged within the tire casing, said cells being arranged exteriorly of each other and free from connection with each other, each cell having an inwardly opening valve, and means to supply air pressure in the tire casing exteriorly of the cells.

4. In a tire of the character described, a tire casing, a plurality of cells arranged therein and having inwardly opening check valves, means to supply air under pressure into the tire casing exteriorly of the cells, and means to automatically open the check valves of the cells upon the expansion of the cells beyond a predetermined limit.

5. In a tire of the character described, as a subcombination, an elastic and expansible cell provided with an inwardly opening check valve, and means to open the check valve upon the expansion of the cell beyond a predetermined limit.

6. In a tire of the character described, as a subcombination, a cell having an inwardly opening check valve, and automatic means to open the check valve.

7. In a tire of the character described, a tire casing, separate relatively small cells arranged therein to fill the casing, a plurality of the cells being contained in the cross sectional area of the casing, each cell having its wall formed of elastic material and sufficiently thick to prevent collapsing of the cell in the ordinary handling of the same while placing the cell within the casing, each cell being disposed exteriorly of the other, means whereby compressed air within the tire casing may pass into the cells and is normally prevented from passing out of the cells, and means to supply compressed air into the tire casing exteriorly of the cells.

In testimony whereof I affix my signature.

WILLIAM H. RICHARDS.